United States Patent [19]

Delaperriere et al.

[11] Patent Number: 5,214,788
[45] Date of Patent: May 25, 1993

[54] PROCESS AND DEVICE FOR INFORMATION TRANSMISSION BETWEEN RADIOELECTRIC TRANSCEIVERS OF THE SAME NETWORK OPERATING IN FREQUENCY HOPPING

[75] Inventors: Jean-Paul Delaperriere, Nanterre; Alain Eberland, Epinay sur Seine; Yves Singlas, Luzarches, all of France

[73] Assignee: Thomson - CSF, Puteaux, France

[21] Appl. No.: 519,115

[22] Filed: May 4, 1990

[30] Foreign Application Priority Data

May 10, 1989 [FR] France ................. 89 06104

[51] Int. Cl.$^5$ .................. H04Q 7/00; H04B 17/02
[52] U.S. Cl. .................. 455/32.1; 455/34.2; 455/161.3
[58] Field of Search .............. 455/32, 34, 161, 165, 455/76, 77, 75, 234; 375/1

[56] References Cited

U.S. PATENT DOCUMENTS 4,794,635 11/1986 Hess .................. 455/34.1
4,872,205 10/1989 Smith .................. 455/34
4,927,608 12/1990 Hashimoto et al. .................. 455/76

FOREIGN PATENT DOCUMENTS 0182762 5/1986 European Pat. Off. .
2203314 10/1988 United Kingdom .

OTHER PUBLICATIONS

IEEE the 14th. Convention of Electrical & Electronics Engineers in Israel, Tel. Aviv, Mar. 26-28, 1985, pp. 1.1.7.1.1.7.5.

Primary Examiner—Reinhard J. Eisenzopf
Assistant Examiner—C. Belzer
Attorney, Agent, or Firm—Cushman, Darby & Cushman

[57] ABSTRACT

The process consists in:
using at least one transceiver station to search for a set of usable frequencies,
transmitting the set of usable frequencies to the other transceivers in the network
and performing the communication transfers in frequency hopping in the set of usable frequencies communicated to all the transceivers in the network.

2 Claims, 2 Drawing Sheets

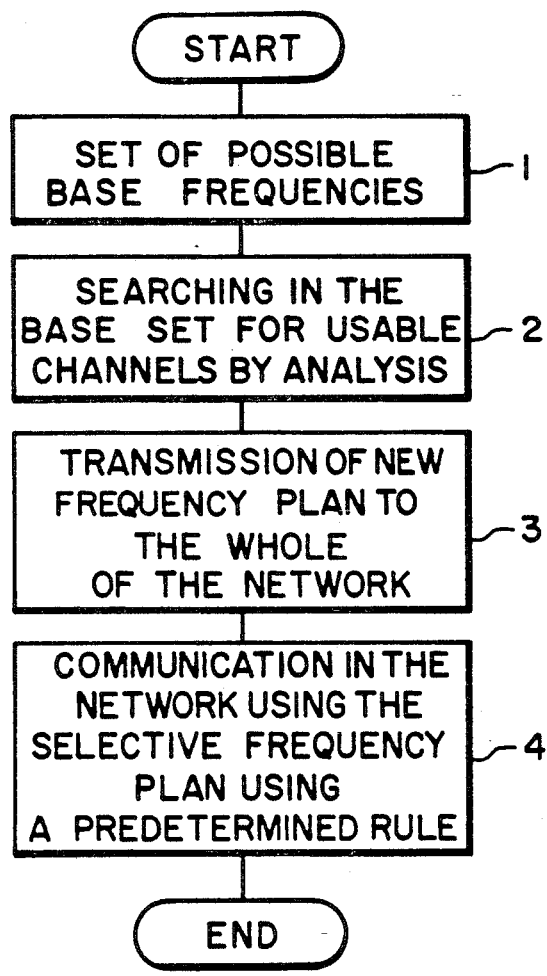
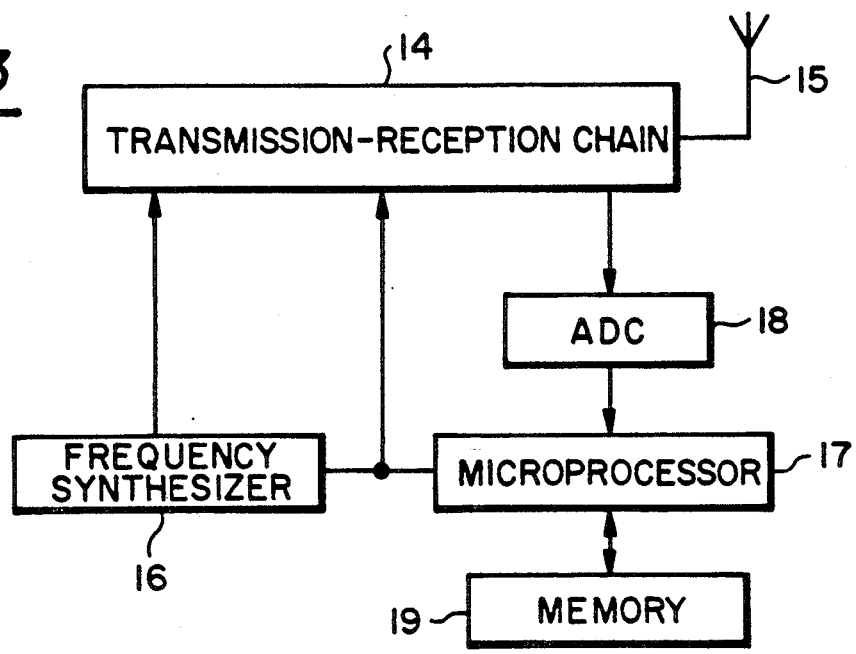

PROCESS AND DEVICE FOR INFORMATION TRANSMISSION BETWEEN RADIOELECTRIC TRANSCEIVERS OF THE SAME NETWORK OPERATING IN FREQUENCY HOPPING

BACKGROUND OF THE INVENTION

1. Field of the Invention

The present invention relates to a process and device for information transmission between radio transceivers of the same network operating in frequency hopping.

2. Description of the Prior Art

It is known in the field of high-frequency radioelectric transmission that spectral crowding depends on the transmission conditions and on the geographic areas over which the transmissions passes.

When the transmission conditions are bad, the receivers receive emissions from both nearby and distant transmitters, and the resulting juxtaposition of signals affects the intelligibility of the useful information received by the receiver.

This phenomenon is particularly troublesome when a network is operating in frequency evasion, where the frequency carrying the information changes several times a second, because these changes in frequency do not take spectral crowding into account. In this mode of operation each receiver, in addition to the useful signal, receives a parasite signal which creates varying degrees of confusion and can even cause loss of the useful information when the ratio between the amplitude of the parasitic and useful signals is high.

SUMMARY OF THE INVENTION

The object of the present invention is to solve the above-mentioned problems. Thus, the object present invention is a process for transmitting information between radio transceivers of the same network operating in frequency evasion comprising the steps of using at least one transceiver station to search for usable frequencies, transmitting a set of usable frequencies to other transceivers in the network and performing a communication transfer in frequency evasion in the set of usable frequencies communicated to all the transceivers in the network.

The main advantage of the present invention is that the quality of the transmission is greatly improved. The present invention can be effectively used in all tactical high-frequency portable, mobile or fixed equipment where crowding of the transmission spectrum presents a considerable nuisance for analog or digital links using frequency evasion.

Other characteristics and advantages of the invention will become apparent upon reading the detailed description in conjunction with the appended figures.

BRIEF DESCRIPTION OF THE DRAWINGS

FIG. 1 is a flow chart showing the information transmission process according to the present invention;

FIG. 3 shows a device used in the process according to the present invention.

DETAILED DESCRIPTION OF THE PREFERRED EMBODIMENTS

Figure 2:
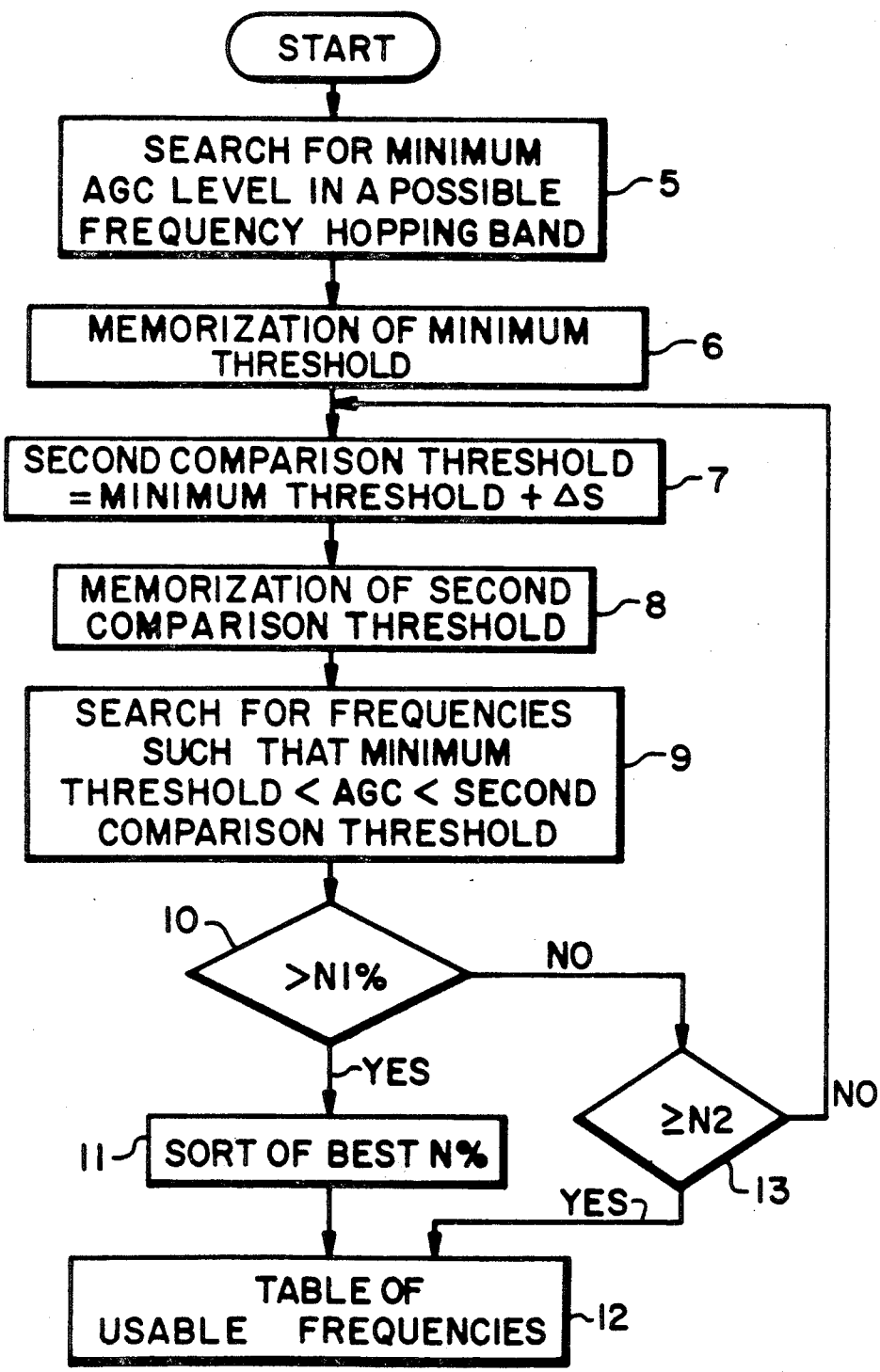
FIG. 2 is a flow chart showing the search for usable frequencies according to the present invention.

The process according to the present invention relates to the transmission of information in transmission networks of at least two radio transceivers operating in random frequency evasion, i.e. in a mode of transmission where the information is carried on frequency steps of predetermined duration, for example between ten ms and a few hundred ms.

The operation process is shown in stages 1 to 4 of the flow chart in FIG. 1 after a known phase, not shown, of synchronization of the transceivers with each other. During stages 1 and 2 a transceiver known as the network master searches for usable channels in a band of base frequencies with a certain number of channels. In stage 3 it then communicates the channels it judges usable to all the other transceivers in the network. This is used in stage 4, the communication of information between all the transceivers in the network taking place in frequency evasion on the usable frequency steps communicated to the whole network by the master transceiver.

The search for the usable frequencies is shown in stages 5 to 13 of the process represented in the flow chart in FIG. 2. In stage 5, the first transmitter to send the synchronizing signals to the rest of the network in a predetermined way becomes the network master and searches among the channels it receives for the one with the weakest reception. This search can be made, for example, by measuring, in the receiver's reception band, the voltage or current levels supplied by the automatic gain control (AGC) circuit of the receiver chain on each channel received, and selecting the channel which gives the lowest voltage or current level, hereinafter referred to as Smini. The voltage or current level obtained is memorized in stage 6 and used in stage 7 to calculate a second comparison threshold S by adding a small increment ΔS of voltage or current to the minimum threshold detected. The second comparison threshold S is memorized in stage 8. In stage 9 a frequency search is performed in the base frequency band, noting those frequencies for which the corresponding voltage or current levels supplied by the automatic gain control device are between the minimum level memorized in stage 6 and the second comparison threshold calculated in stage 7. If more than a predetermined number (N1)% of the frequencies fulfil this condition, they are sorted in stage 11 to determine the (N1)% of frequencies giving the lowest voltage or current levels. The corresponding frequencies are memorized in stage 12 to form a table of the usable frequencies. On the other hand, if at stage 10 the number of frequencies fulfilling the conditions tested in stage 9 is less than the predetermined number of (N1)% of the frequencies, a new test is performed in stage 13 to compare the number of frequencies with a second number equal to a second predetermined number (N2)% of the frequencies noted in stage 9, such that N2 is less than N1. If the number of frequencies fulfilling the conditions tested in stage 9 is less than (N2)% of the frequencies, stages 7 to 10 are repeated and a new threshold is calculated in stage 7 by adding a new small increment ΔS to the minimum threshold memorized in stage 6. The process continues in this way until the results of the tests in stages 10 to 13 are satisfactory.

The process described above can be modified to take into account situations where the transceiver network is formed of members geographically very distant from each other and using different scramblers. In this case, it is conceivable that the frequencies considered usable could be transmitted by all or some of the network members during initialization and that the concatenation of all these would then be used to communicate information between all the members.

A mode of implementation of the process according to the invention is a transceiver shown in FIG. 3. The transceiver shown is composed, in known fashion, of a receiver chain 14 coupled to a transmission-reception antenna 15. The receiver chain 14 is driven in a known way by a frequency synthesizer 16. A microprocessor 17 is coupled between the receiver chain 14 and the frequency synthesizer 16 via an analog-digital converter 18 which transforms the voltage or current level supplied by the automatic gain control device in the reception chain 14 into digital signal samples and applies these samples to the data input port of the microprocessor 17. A memory 19, also coupled to the microprocessor 17, contains the program instructions necessary for the execution of the process described above with the flow charts in FIGS. 1 and 2.

The memory 19 also memorizes the decision thresholds, and at the end of the analysis the table of usable frequencies. The set of memorized frequencies is used to control the frequency switching of the frequency synthesizer 16 to enable the transceiver to operate in frequency evasion. It is also applied to the transmission chain 14 to perform its transmission to all the other transceivers in the network. This transmission can, for example, be done by giving each transmitted frequency a number.

What is claimed is:

1. A process of transmitting information between radio transceivers in the same network operating in frequency hopping, comprising the steps of:
    using at least one transceiver station to search for a set of usable frequencies from channels it receives;
    determining a first minimum comparison threshold value corresponding to the channel with the weakest reception level;
    determining a second comparison threshold value by adding a predetermined incremental value to the first minimum comparison threshold value;
    selecting a set of usable frequencies from the other channels received, the set of usable frequencies being channels with reception levels between the first and the second minimum comparison threshold values;
    storing a limited number of the set of usable frequencies, the limited number corresponding to frequencies within the set of usable frequencies with the lowest reception levels;
    transmitting the set of usable frequencies to the other transceivers in the network; and
    transmitting, during frequency hopping, the set of usable frequencies to all of the transceivers in the network.

2. The process according to claim 1 wherein, when the transceivers in the network are geographically distant from each other, the set of usable frequencies are determined by all or some of the transceivers in the network and a concatenation of all of the usable frequencies is performed to form the set of usable frequencies.

* * * * *